(12) United States Patent
Grimm

(10) Patent No.: US 6,447,023 B1
(45) Date of Patent: Sep. 10, 2002

(54) AIR MANAGEMENT APPARATUS AND METHOD HAVING MANIFOLD AND PASS-THROUGH COMPONENTS

(75) Inventor: Mark T. Grimm, Frisco, TX (US)

(73) Assignee: Paccar Inc, Bellevue, WA (US)

( * ) Notice: Subject to any disclaimer, the term of this patent is extended or adjusted under 35 U.S.C. 154(b) by 0 days.

(21) Appl. No.: 09/492,411

(22) Filed: Jan. 27, 2000

(51) Int. Cl.⁷ ................................................ F16L 39/00
(52) U.S. Cl. ...................... 285/319; 285/921; 285/124.3
(58) Field of Search ........................... 285/124.1–124.5, 285/FOR 118, 210, 140.1, 319, 921

(56) References Cited

U.S. PATENT DOCUMENTS

| | | | | |
|---|---|---|---|---|
| 3,193,226 A | * | 7/1965 | Showalter | 285/921 |
| 3,469,863 A | * | 9/1969 | Riester et al. | 285/319 X |
| 3,640,552 A | * | 2/1972 | Demler, Sr. et al. | 285/319 |
| 4,482,172 A | * | 11/1984 | DeVera et al. | 285/319 |
| 4,754,993 A | * | 7/1988 | Kraynick | 285/319 |
| 4,804,208 A | * | 2/1989 | Dye | 285/319 |
| 4,890,866 A | * | 1/1990 | Arp | 285/319 |
| 4,893,845 A | * | 1/1990 | Bartholomew | 285/319 |
| 4,900,065 A | * | 2/1990 | Houck | 285/319 |
| 5,219,185 A | * | 6/1993 | Oddenino | 285/921 |
| 5,478,119 A | * | 12/1995 | Dye | 285/921 |
| 5,692,783 A | * | 12/1997 | Watanabe et al. | 285/140.1 X |
| 5,865,474 A | * | 2/1999 | Takahashi | 285/124.1 |

* cited by examiner

Primary Examiner—Lynne H. Browne
Assistant Examiner—David E. Bochna
(74) Attorney, Agent, or Firm—Sidley Austin Brown & Wood LLP

(57) ABSTRACT

An air management apparatus and method is provided which includes both a pass-through air passage and a manifold air passage in a single, compact structure useful for controlling air transfer necessary for pneumatically controlled systems and instruments. The air management apparatus has a base plate with a device for removably attaching the air management apparatus to a firewall or other structure, and also has at least one pass-through air passage and at least one manifold air passage formed in the base plate. At least one exhaust air passage, which is a type of pass-through air passage, can also be formed in the base plate. The pass-through air passage receives air into a single inlet port and expels air out of a single outlet port, while the manifold air passage receives air into a single inlet port and expels air out at least two outlet ports. The device for removably attaching the air management apparatus to a firewall or other structure is preferably a pair of removably attachable retaining clips wherein each retaining clip has a first end fixed to the base plate and a second end movable relative to the base plate such that the second end can be moved between a released position and an attached position. A gasket can also be attached to a perimeter of the base plate to create a seal when the retaining clips are in the attached position and the base plate is attached to a firewall or other structure. To simplify connection of air hoses to the air passages, a connector can be secured to each inlet and outlet port of each air passage.

28 Claims, 6 Drawing Sheets

AIR MANAGEMENT APPARATUS AND METHOD HAVING MANIFOLD AND PASS-THROUGH COMPONENTS

TECHNICAL FIELD OF THE INVENTION

The present invention relates generally to an air management system for transporting air. In one aspect, it relates to an apparatus and method for receiving and distributing air in order to pneumatically control certain mechanical components of a vehicle from within an interior area of the vehicle.

BACKGROUND OF THE INVENTION

It is commonly known to use pneumatic controls for controlling the operation of various functions of a vehicle, particularly in trucks, vans, and other large commercial vehicles. For instance, pneumatic controls can be used to control the operation of brake systems, trailer releases, dump truck lifting mechanisms, air hoses, and many other systems. These pneumatic controls are generally located inside the cab of the truck or other vehicle so that the driver can conveniently control these systems without having to exit the vehicle. Because the systems to be controlled by the pneumatic controls are typically located outside the cab of the truck, it is necessary to transport the compressed air or vacuum between the cab of the truck and the systems outside the cab of the truck. Accordingly, an air management apparatus or method is necessary.

There are three general types of connections for transporting air: a pass-through air passage, a manifold air passage, and an exhaust air passage. A pass-through air passage is a simple connection from a single inlet port to a single outlet port without any splits or branches in the passage for dividing the compressed air transported through the passage. A manifold air passage, on the other hand, has splits or branches in the passage such that the air is redirected or divided from a single inlet port to multiple outlet ports. Of course, both pass-through air passages and manifold air passages can also transport air from the outlet port or ports back to the inlet port such that there is a two-way communication achieved by transporting the air between the air hoses in the cab of the truck and the pneumatically controlled systems. An exhaust passage, on the other hand, is simply a form of pass-through air passage which directly exhausts incoming air or other gases from air hoses located in the cab of the truck to the atmosphere. The need or desirability of using a pass-through air passage, a manifold air passage, or an exhaust passage depends on the systems being pneumatically controlled by the driver. In a typical truck, there are several independent systems that are controlled pneumatically, each with different requirements, i.e., certain of the systems may require pass-through air passages only, some may require manifold air passages only, some may require exhaust passages only, and some may require some combination of the three.

Prior to this invention, there has been no apparatus or method for combining pass-through air passages and manifold air passages into a single component, thus allowing a single air management apparatus or method to accommodate the requirements of all of the pneumatically controlled systems in a truck or other vehicle. Instead, different components have been used to accomplish different tasks. In fact, one practice prior to this invention has been to simply use pass-through air passages for directing the compressed air out of the cab of the vehicle, and then use additional components outside the cab to manipulate the compressed air in the required manner. For instance, in a truck which has three pneumatically controlled systems wherein the first system requires pass-through air passages only, the second system requires manifold air passages only, and the third system requires a combination of pass-through and manifold air passages, one solution has been to use multiple independent components to meet these requirements. In particular, one pass-through air passage component would be mounted in the firewall (or other exterior wall of the cab of the truck) for each system such that the compressed air for each system could be transported out of the cab of the truck. Then, individual manifold components would be mounted outside of the cab such that the compressed air which had already been transported out of the cab could be manipulated as necessary for the second system and the third system.

Although the practice of using multiple components to meet the requirements for multiple pneumatically controlled systems achieves the intended purpose, it has several disadvantages. For one, multiple components are more costly to manufacture and install than a single component. Additionally, multiple components are more difficult to install because they inherently require multiple steps. Multiple components also require more space for installation. In contrast, an air management apparatus and method that utilizes only a single component would provide the following advantages: lower cost, simpler and easier installation and maintenance, and smaller space required to accommodate the compact single-component apparatus. Therefore, a need exists to improve upon the prior art apparatus and method of transporting compressed air to and from the cab of a truck for the purpose of controlling a pneumatically controlled system located outside the cab of the truck.

SUMMARY OF THE INVENTION

An air management apparatus and method is provided for transporting compressed air to and from air hoses located in an interior area of a vehicle in order to control certain pneumatically controlled mechanical systems of the vehicle. The air management apparatus and method of the current invention can be used for many vehicle applications, but is particularly suited for use in commercial trucks, vans, and other large vehicles which tend to have numerous pneumatically controlled systems for functions like air brakes, transmissions, air homes, air seats and the like. The air management apparatus and method includes both a pass-through air passage and a manifold air passage in a single, compact structure. Specifically, the invention includes in one embodiment a base plate has mechanisms for removably attaching the air management apparatus to a firewall or other structure, and at least one pass-through air passage and at least one manifold air passage are formed in the base plate. In another embodiment, at least one exhaust air passage, which is a type of pass-through air passage, can also be formed in the base plate. The pass-through air passage receives air into a single inlet port and expels air out of a single outlet port, while the manifold air passage receives air into a single inlet port and distributes air to and expels air out of at least two outlet ports.

In another embodiment, the device for removably attaching the air management apparatus to a firewall or other structure is a pair of removably attachable retaining clips wherein each retaining clip has a first end fixed to the base plate and a second end movable relative to the base plate such that the second end can be moved between a released position and an attached position. In this embodiment, the second end of each retaining clip can have a stepped edge shaped to be releasably secured to an edge of the firewall or other structure, thus allowing the retaining clip to be moved between a released position and an attached position.

In another embodiment, a gasket can be attached to a perimeter of the base plate to create a seal when the base plate is attached to a firewall or other structure. By including a gasket, the air management apparatus and method of the current invention can have a self-sealing function to further simplify installation and maintenance.

In yet another embodiment, an air hose connector can be secured to the inlet and outlet ports of each air passage to simplify connection of air hoses to the air passages. The air hose connector can comprise a known type of connector such as push-to-connect fitting, clamps, and other connectors suitable for making a connection with an air hose.

In a preferred embodiment, the air management apparatus and method of the current invention includes multiple pass-through air passages, multiple manifold air passages, and multiple exhaust air passages. Furthermore, this preferred embodiment allows each pass-through air passage and each manifold air passage to act as both inlet and outlet ports such that air can be transported in two directions. In other words, each pass-through air passage and each manifold air passage allows two-way communication between the operator and the pneumatically controlled systems.

The invention also relates to a method involving providing a base plate having pass-through and manifold passages, selectively following air through to pass through passage and selectively flowing air through the manifold passage.

BRIEF DESCRIPTION OF THE DRAWINGS

A more thorough and complete understanding of the present invention and the advantages thereof will be gained from the following detailed description, claims, and accompanying drawings in which:

DETAILED DESCRIPTION

Figure 1:
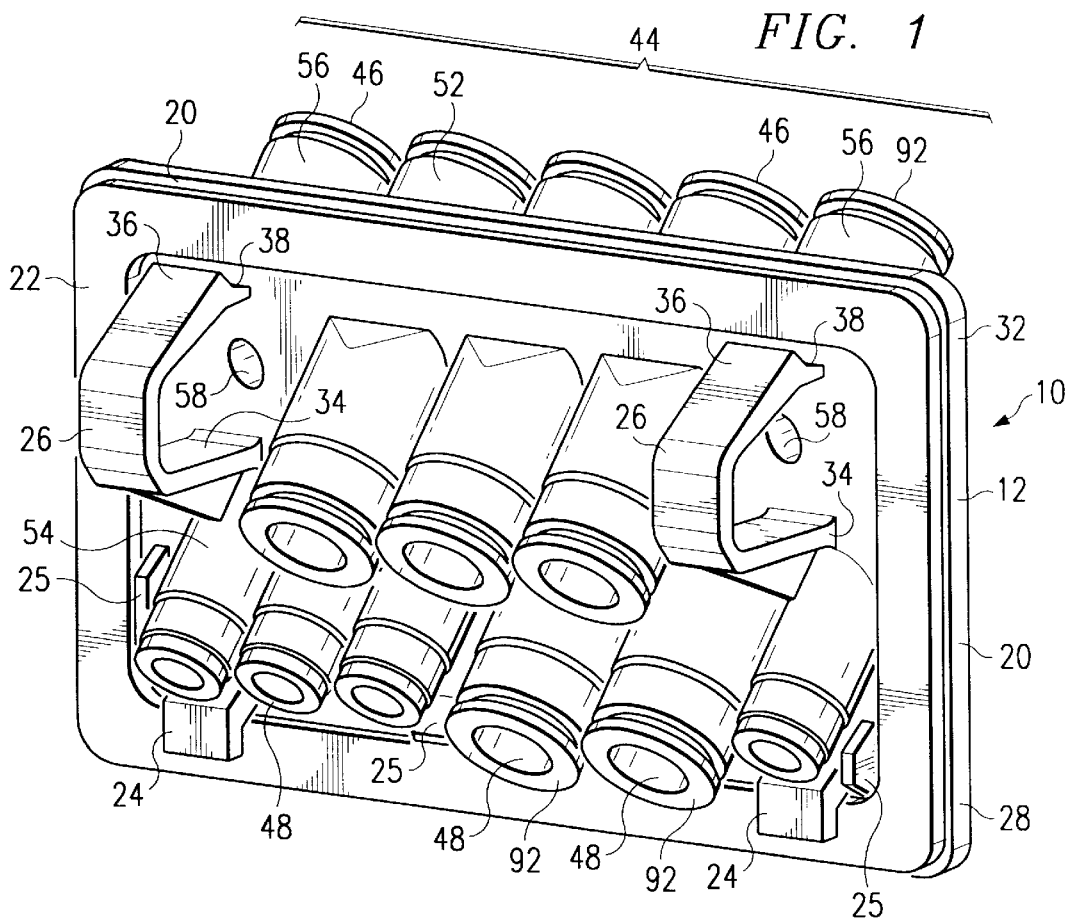
FIG. 1 is a perspective view of an air management apparatus having multiple pass-through air passages and multiple manifold air passages according to the present invention.

With reference to the accompanying FIGS. 1–11, wherein like reference numerals designate like or corresponding parts throughout the several views, the present invention is explained hereafter.

FIG. 1 illustrates an air management apparatus 10 according to the present invention. Although air management apparatus 10 can be used in any application which requires the connection of air passages in a manifold arrangement, a pass-through arrangement, or some combination of the two, the preferred embodiment of this invention will be described in the context of its installation in the firewall separating the interior cab from the engine compartment of a heavy-duty truck. It is important to note, however, that other applications such as smaller trucks, cars, or other types of vehicles (i.e., cranes, boats, planes, etc.) having pneumatically controlled systems can also benefit from using air management apparatus 10 of the current invention. Furthermore, it is not necessary that air management apparatus 10 be installed only in a firewall, but instead would also be useful in any application requiring a manifold and/or pass-through connection of air passages which is easily installed and maintained. For instance, air management apparatus 10 could also be installed in a rear wall of the interior cab of a truck such that apparatus 10 connects the interior of the cab directly to the exterior of the truck rather than to the engine compartment. Furthermore, the typical application of air management apparatus 10 would be to transport compressed air, but apparatus 10 is also appropriate for transporting other gases or vacuum.

Figure 2:
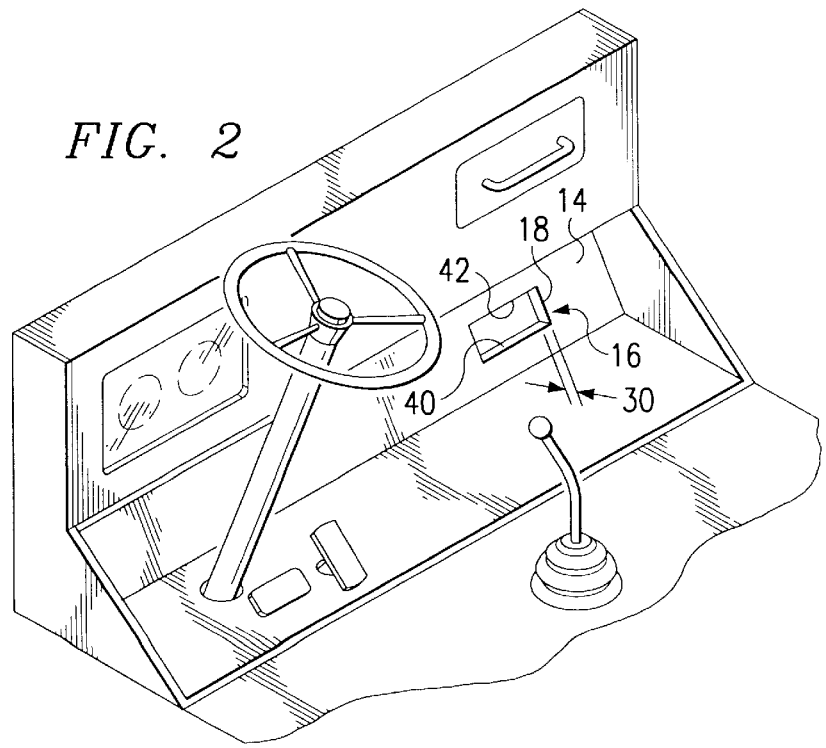
FIG. 2 is a plan view of a firewall or other mounting structure on which the air management apparatus depicted in FIG. 1 can be mounted.

FIG. 1 shows the preferred embodiment of air management apparatus 10, which includes a base plate 12 that can be properly seated on firewall 14. FIG. 2 illustrates firewall 14 to which air management apparatus 10 can be mounted (it should again be emphasized, however, that any structure having the features described with respect to firewall 14 is equally appropriate for mounting air management apparatus 10). Firewall 14 has a hole 16 with a perimeter 18 that generally conforms to the perimeter 20 of base plate 12, except that the perimeter 18 of hole 16 has slightly smaller width and height dimensions. In this manner, base plate 12 can completely cover hole 16 and can make uniform contact with firewall 14 around the perimeter 18 of hole 16.

Referring again to FIG. 1, a gasket 22 is preferably attached along the perimeter 20 of base plate 12 to form a seal between base plate 12 and firewall 14. This sealing function serves to prevent exhaust gases from entering the cab of the truck from the engine compartment or from outside the cab. Alternatively, gasket 22 can be attached along the perimeter 18 of hole 16 in firewall 14 to accomplish the same purpose.

For aligning and removably attaching base plate 12 in hole 16 of firewall 14, a preferred embodiment provides base plate 12 has a pair of feet 24 and a pair of retaining clips 26 located on opposing ends of base plate 12. Each foot 24 is essentially an inverted and rigid L-shaped protrusion from a lower portion 28 of base plate 12 which extends at least the width 30 of firewall 14. In this manner, each foot 24 protruding from base plate 12 forms a rigid hook that can be aligned with and seated on the width 30 of firewall 14, thus providing support to maintain the position of base plate 12 relative to firewall 14. On the other hand, each retaining clip 26 can removably secure an upper portion 32 of base plate 12 to firewall 14. In the preferred embodiment shown in FIGS. 1 and 5, each retaining clip 26 is essentially C-shaped with one fixed end 34 attached to base plate 12 and one free end 36 extending freely to allow elastic deformation of retaining clip 26. Additionally, free end 36 of retaining clip 26 has a stepped edge 38 for seating on the width 30 of firewall 14. To install this preferred embodiment of base plate 12, lower portion 28 of base plate 12 is aligned with a bottom edge 40 of hole 16 in firewall 14, feet 24 are seated on bottom edge 40, and upper portion 32 of base plate is pressed toward a top edge 42 of hole 16 until each retaining clip 26 deforms enough such that stepped edges 38 snap over the width 30 of firewall 14. Once installed, base plate 12 can be removed by elastically deforming each retaining clip 26 until stepped edges 38 are unseated from the width 30 of firewall 14, and then simply lifting base plate 12 off of bottom edge 40 of hole 16.

Although the preferred embodiment of base plate 12 has been described, other alternative embodiments for removably attaching air management apparatus 10 are also within the scope of this invention. For instance, clamps, levers, snaps, screws or other removable attachment devices are appropriate. Additionally, feet 24 can be replaced with additional attachment devices, or the seating function of feet 24 can be reinforced by using additional support features 25 designed to maintain the position of base plate 12 relative to firewall 14. Alternatively, a one or more retaining clip 26 can be provided at the bottom portion of the base and one or more retaining clips 26 can be provided at the top. In this matter, either the top or bottom of the base plate can be released.

Attached to and passing through base plate 12 are several air passages 44, each having a cab side port 46 and an engine side port 48. Cab side port 46 and engine side port 48 can also be referred to as an inlet port and an outlet port, but at different times during the use of air management apparatus 10, cab side port 46 (and engine side port 48) may be used as either an inlet port or an outlet port depending on the direction of air flow through air management apparatus 10. In the embodiment shown in FIGS. 1, 3, and 4, air passages 44 are substantially cylindrical along their lengths and are oriented at an angle of from about 30° to 60° and most preferably approximately forty-five (45) degrees relative to base plate 12. Air passages 44 can be formed in other shapes and oriented at other angles as long as air hoses 50 (shown in FIGS. 8 and 9) can be connected to ports 46, 48 and air passages 44 can transport air from cab side port 46 to engine side port 48, and vice versa. One advantage of forming air passages 44 in a substantially cylindrical shape is that the aerodynamics of the air being transported between ports 46, 48 are changed the least by such a shape, especially since most air hoses 50 are also cylindrical in shape. One advantage of orienting air passages 44 at an angle of approximately forty-five (45) degrees is for purposes of installation and maintenance. Air management apparatus 10 is typically installed in a firewall 14 near the floorboard of the cab of a truck and this area of firewall 14 is accessed easiest from above inside the cab and from below inside the engine compartment. As a result, orienting air passages 44 to face upward inside the cab and to face downward inside the engine compartment allows easier visual and physical access to attach air hoses 50 to the cab side ports 46 and engine side ports 48, respectively, of air passages 44.

Each air passage 44 can be one of three types: a pass-through air passage 52, a manifold air passage 54, or an exhaust air passage 56. A pass-through air passage 52 simply connects a single cab side port 46 to a single engine side port 48 and is generally cylindrical with a uniform diameter along its length. A manifold air passage 54, on the other hand, connects one cab side port 46 to multiple engine side ports 48, or vice versa, using splits or branches in the air passage. With both a pass-through air passage 52 and a manifold air passage 54, the size or shape of the air passage can vary between the cab side and the engine side to accommodate hoses of varying sizes and shapes. An exhaust air passage 56 is simply a variant of a pass-through air passage in which gases entering the cab side port 46 are exhausted directly into the engine compartment or other external space, without the need for an engine side port 48. With an exhaust air passage 56, there is generally no structure on the engine side of base plate 12 such that there is simply an exhaust hole 58 formed in base plate 12 through which the exhaust gases flow. However, an engine side structure can be used if desired.

To aid in connecting and removing air hoses 50 to and from air passages 44, hose connectors 92 can be used which are known in the art. In a preferred embodiment shown in FIG. 1, hose connectors 92 are push-to-connect fittings which can be molded into both cab side ports 46 and engine side ports 48 of air passages 44. Other alternatives for hose connectors 92 also include interference-type fittings, clamp-type fittings, and other known connection devices and methods.

Figure 3:
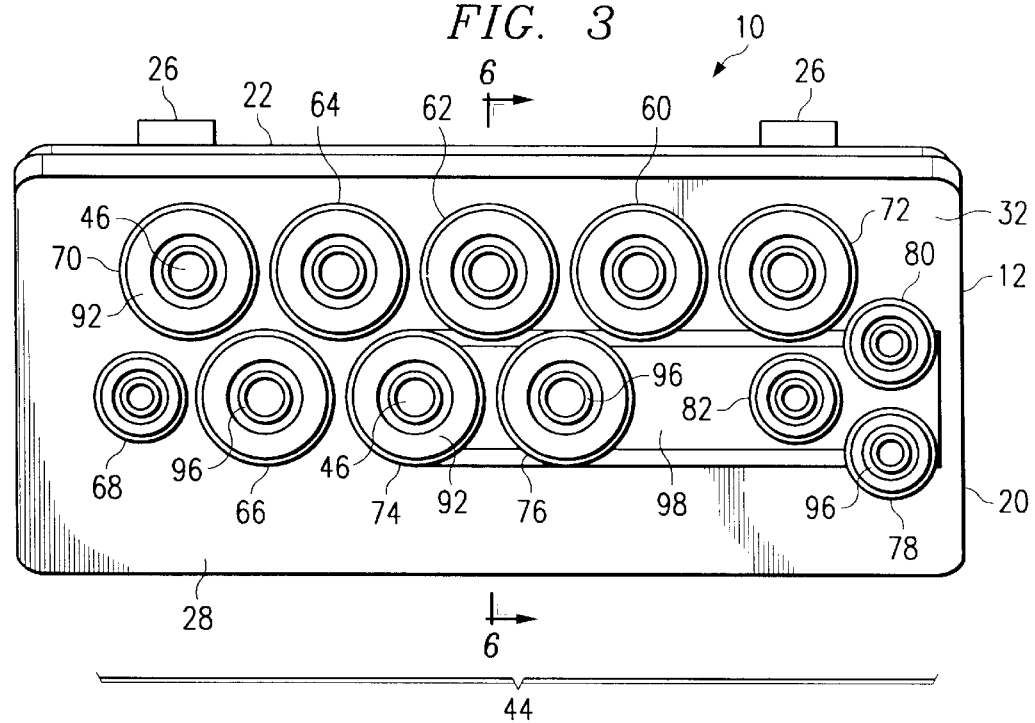
FIG. 3 is an elevational view of a cab side of the air management apparatus depicted in FIG. 1.
Figure 4:
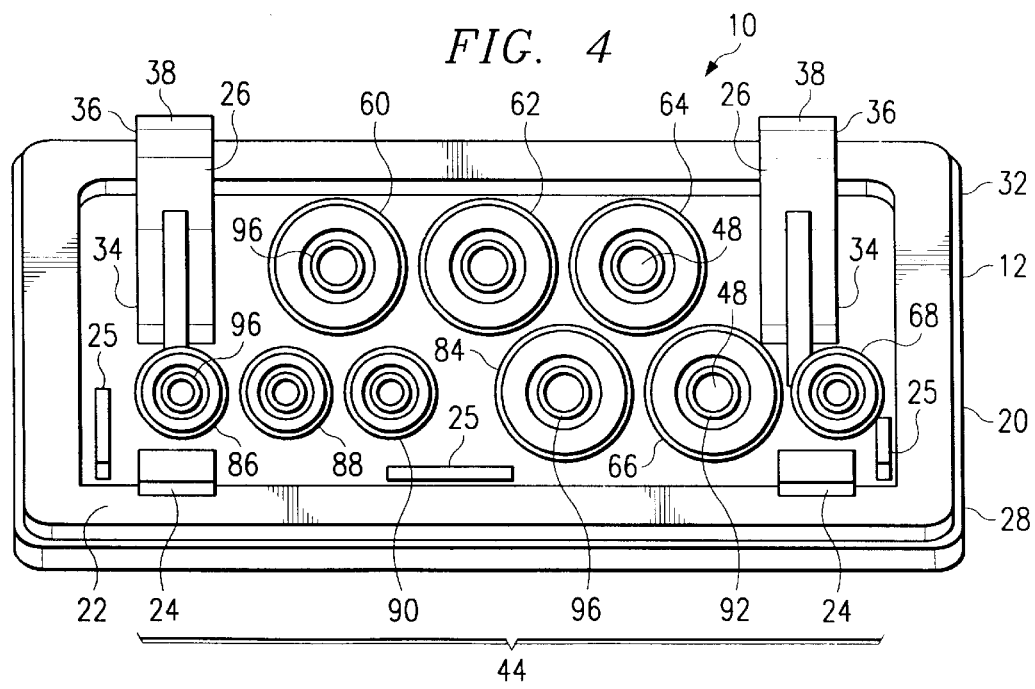
FIG. 4 is an elevational view of an engine side of the air management apparatus depicted in FIG. 1.
Figure 10:
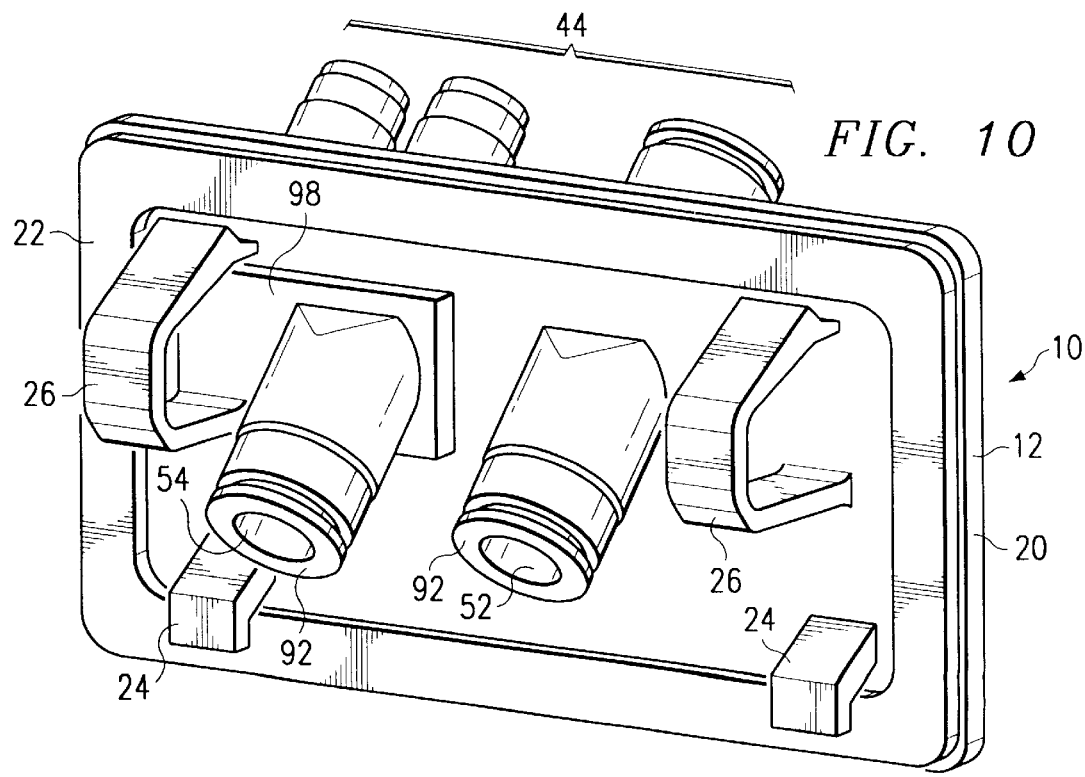
FIG. 10 is a perspective view of an air management apparatus having a single pass-through air passage and a single manifold air passage according to the present invention.

As illustrated in FIG. 10, it is within the scope of this invention to have a single pass-through air passage 52 and a single manifold air passage 54. The number of pass-through and manifold air passages should be determined based on the requirements of the particular application. However, FIG. 1 shows one preferred embodiment having multiple pass-through air passages 52, multiple manifold air passages 54, and multiple exhaust air passages 56. Furthermore, individual air passages 52, 54, and 56 can be of varying diameters to accommodate air hoses 50 used for varying purposes and having varying dimensions. With particular reference to FIGS. 3 and 4, the preferred embodiment depicted includes four (4) large-diameter pass-through air passages 60, 62, 64, 66, one (1) small-diameter pass-through air passage 68 of a relatively smaller diameter, and two (2) large-diameter exhaust air passages 70, 72. As for the manifold air passages 54, FIG. 3 shows two (2) large-diameter cab side manifold air passages 74, 76 and three (3) small-diameter cab side manifold air passages 78, 80, 82 of a relatively smaller diameter. FIG. 4 further shows one (1) large-diameter engine side manifold air passage 84 of a relatively larger diameter and three (3) small-diameter engine side manifold air passages 86, 88, 90 of a relatively smaller diameter. Each of the five (5) cab side manifold air passages 74, 76, 78, 80, 82 is in fluid communication with each of the four (4) engine side manifold air passages 84, 86, 88, 90.

As an example of the advantages of using different types of air passages having varying sizes, it is helpful to review the wide range of pneumatically controlled systems which can be managed by an air management apparatus 10 of the preferred embodiment shown in FIGS. 3 and 4. The following table illustrates one possible set of applications of the preferred embodiment of air management apparatus 10:

| AIR PASSAGE ELEMENT | TYPE OF USE |
| --- | --- |
| Large-diameter pass-through air passage 60 | To hand valve delivery |
| Large-diameter pass-through air passage 62 | To MV-3 trailer delivery |
| Large-diameter pass-through air passage 64 | To MV-3 tractor delivery |

-continued

| AIR PASSAGE ELEMENT | TYPE OF USE |
|---|---|
| Large-diameter pass-through air passage 66 | To MV-3 rear supply |
| Small-diameter pass-through air passage 68 | To air horn |
| Large-diameter exhaust air passage 70 | From MV-3 exhaust |
| Large-diameter exhaust air passage 72 | From hand valve exhaust |
| Large-diameter cab side manifold air passage 74 | To MV-3 forward supply |
| Large-diameter cab side manifold air passage 76 | To hand valve forward supply |
| Small-diameter cab side manifold air passage 78 | To air horn valve forward supply |
| Small-diameter cab side manifold air passage 80 | To air rocker valves forward supply |
| Small-diameter cab side manifold air passage 82 | Spare |
| Large-diameter engine side manifold air passage 84 | To MV-3 forward supply |
| Small-diameter engine side manifold air passage 86 | To transmission |
| Small-diameter engine side manifold air passage 88 | To fan clutch |
| Small-diameter engine side manifold air passage 90 | To air seat |

There are obviously many other permutations of potential uses for the preferred embodiment described herein and for other variations of air management apparatus 10 within the scope of the present invention. If any air passages are not needed for a particular application, they can simply be plugged to prevent leakage and can be unplugged if they become needed for a later application.

Figure 6:
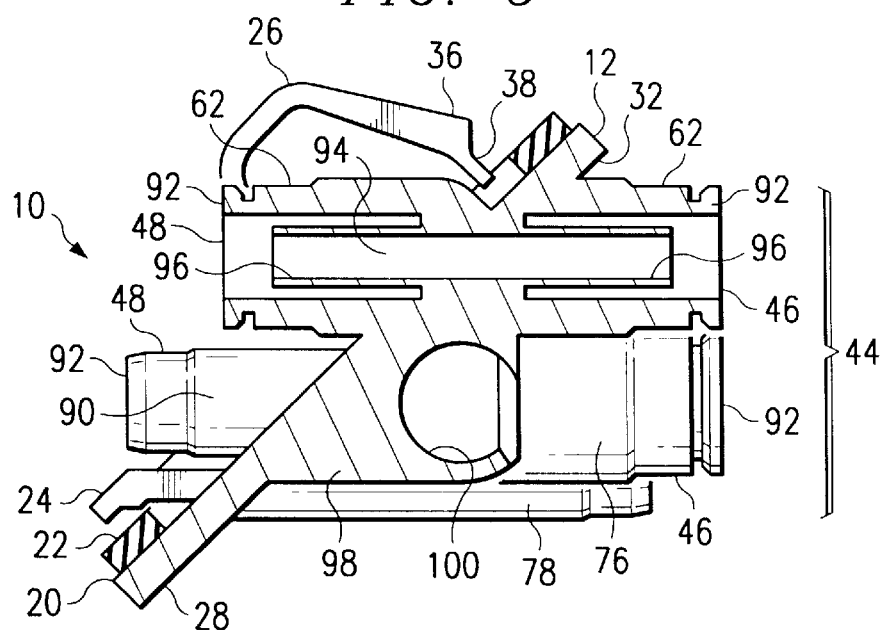
FIG. 6 is a sectional view taken along the line 6—6 of the air management apparatus depicted in FIG. 3.
Figure 7:
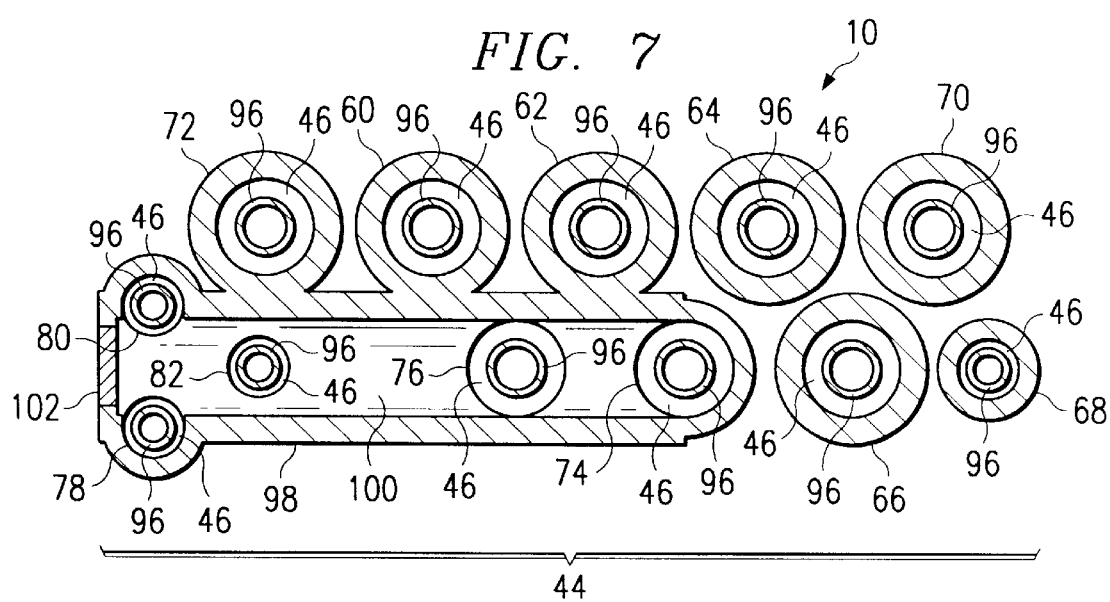
FIG. 7 is a sectional view showing a partial section taken along the line 7—7 of the air management apparatus depicted in FIG. 5.

FIGS. 6 and 7 show one embodiment of an internal structure of the air management apparatus 10 of the present invention. Specifically, these figures show how a pass-through air passage transports air from a single cab side port to a single engine side port and how a manifold air passage transports air from a single cab side port to multiple engine side ports or from a single engine side port to multiple cab side ports. Referring to FIG. 6, it can be seen that pass-through air passage 62 (which is also representative of other pass-through air passages 60, 64, 66 68) has a pass-through chamber 94 with a substantially cylindrical cross-sectional area which passes through base plate 12 between a cab side port 46 and an engine side port 48. One acceptable alternative embodiment would be to vary the size of pass-through chamber 94 along its length such that cab side port 46 and engine side port 48 have different diameters. FIG. 6 also provides greater detail of a hose connector 92 in the form of push-to-connect fittings 96 molded into the cab side port 46 at one end of pass-through chamber 94 and the engine side port 48 at another end of pass-through chamber 94. To install, an air hose 50 is inserted into either cab side port 46 or engine side port 48, and then slid over push-to-connect fitting 96 protruding through pass-through chamber 94, thus forming an interference seal between air hose 50 and push-to-connect fitting 96.

Figure 5:
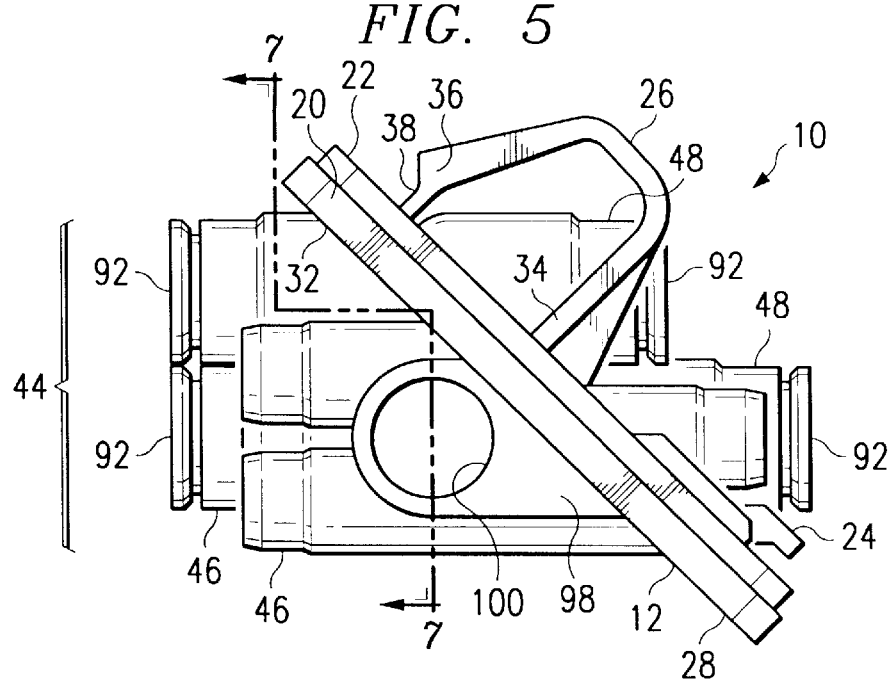
FIG. 5 is a side elevational view of the air management apparatus depicted in FIG. 1.

With respect to the internal structure of manifold air passages according to the present invention, the exterior of a manifold structure 98 is shown in FIGS. 3 and 5, and a manifold chamber 100 formed by the interior of manifold structure 98 is shown in FIGS. 6 and 7. Compressed air flows through manifold chamber 100 and thus is transported between ports 46, 48. In particular, FIG. 6 shows a side view into manifold chamber 100. As can be seen, in a preferred embodiment, manifold chamber 100 is cylindrical with an axis oriented in a direction generally parallel to the plane formed by base plate 12. This shape simplifies the manufacturing process in that the cylindrical hole can be bored from one side of manifold chamber 100, and then a plug 102 (shown in FIG. 7) can be used to enclose the interior space of manifold chamber 100. FIG. 7 illustrates that several manifold air passages (82, 80, 74, 76, 78) can lead into and out of manifold chamber 100, thus allowing compressed air to flow between multiple cab side ports 46 and multiple engine side ports 48. For instance, air flowing into a single cab side manifold air passage 80 can flow into manifold chamber 100 and then can exit from any of engine side manifold air passages 84, 86, 88, 90 (shown in FIG. 4) or any of cab side manifold air passages 74, 76, 78, 82. In other words, once air flows into manifold chamber 100 from any manifold air passage, it can then exit through any other manifold air passage which is also in fluid communication with manifold chamber 100.

Figure 8:
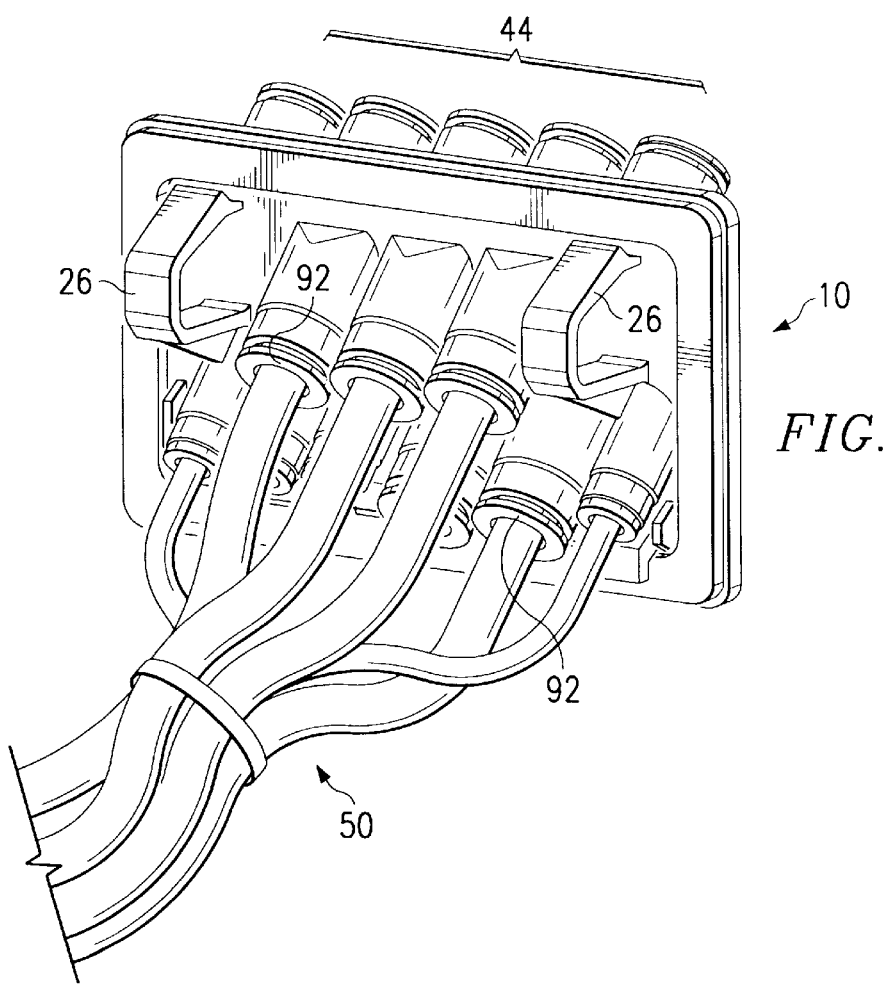
FIG. 8 is an assembly view of the engine side of the air management apparatus depicted in FIG. 4, having air hoses connected thereto.
Figure 9:
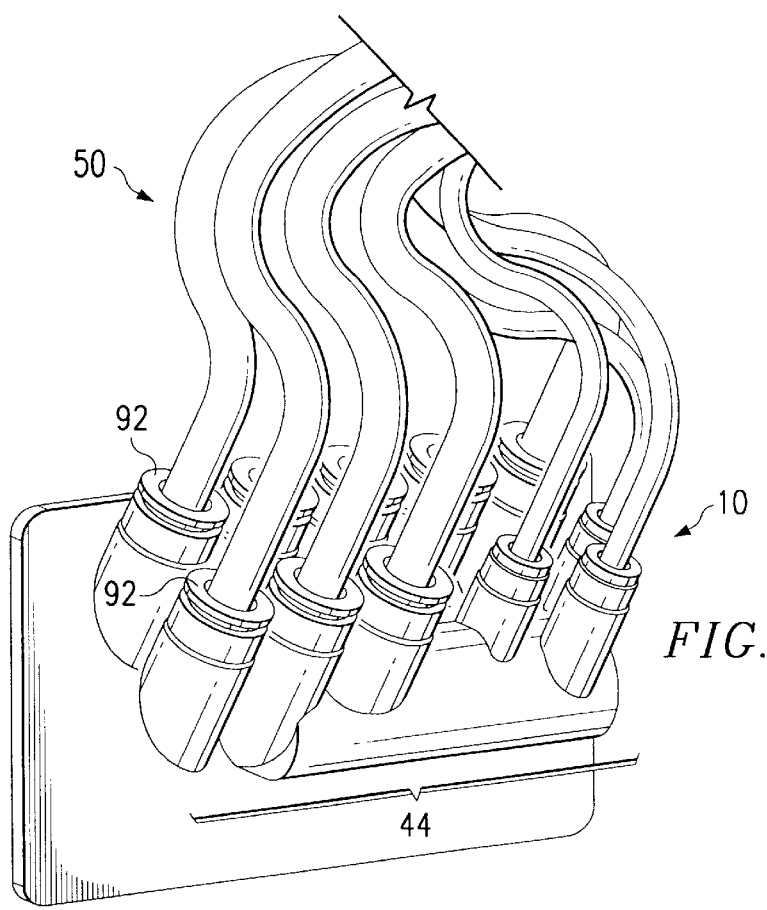
FIG. 9 is an assembly view of the cab side of the air management apparatus depicted in FIG. 3, having air hoses connected thereto.

FIGS. 8 and 9 illustrate the connection of air hoses to air management apparatus. In FIG. 8 air management apparatus 10 is held in place by clips 26. Air hoses 50 are connected to air passages 44 by hose connectors 92. FIG. 9 shows the other side of the air management system 10 shown in FIG. 8. Air hoses 50 are connected to passage 44 by connectors 92. The user can select which side of the air management system is the engine side.

To assist a user in installing and maintaining air management apparatus 10, an indicating means can be used to guide a user as to which air hoses should be properly connected to which air passages. One indicating means is to color-code each individual air passage 44 in a manner that matches a color of a properly corresponding air hose 50. Other systems include numbering air passages 44 and textually labeling air passages 44 to correspond to specific air hoses 50. Also, the shapes of cab side ports 46 and engine side ports 48 could be selected such that each is distinct from the other, and thus only one air hose 50 will fit onto an individual port 46, 48. Additional means for indicating which air hoses 50 correspond with which air passages 44 will become apparent to one of ordinary skill in the art.

Figure 11:
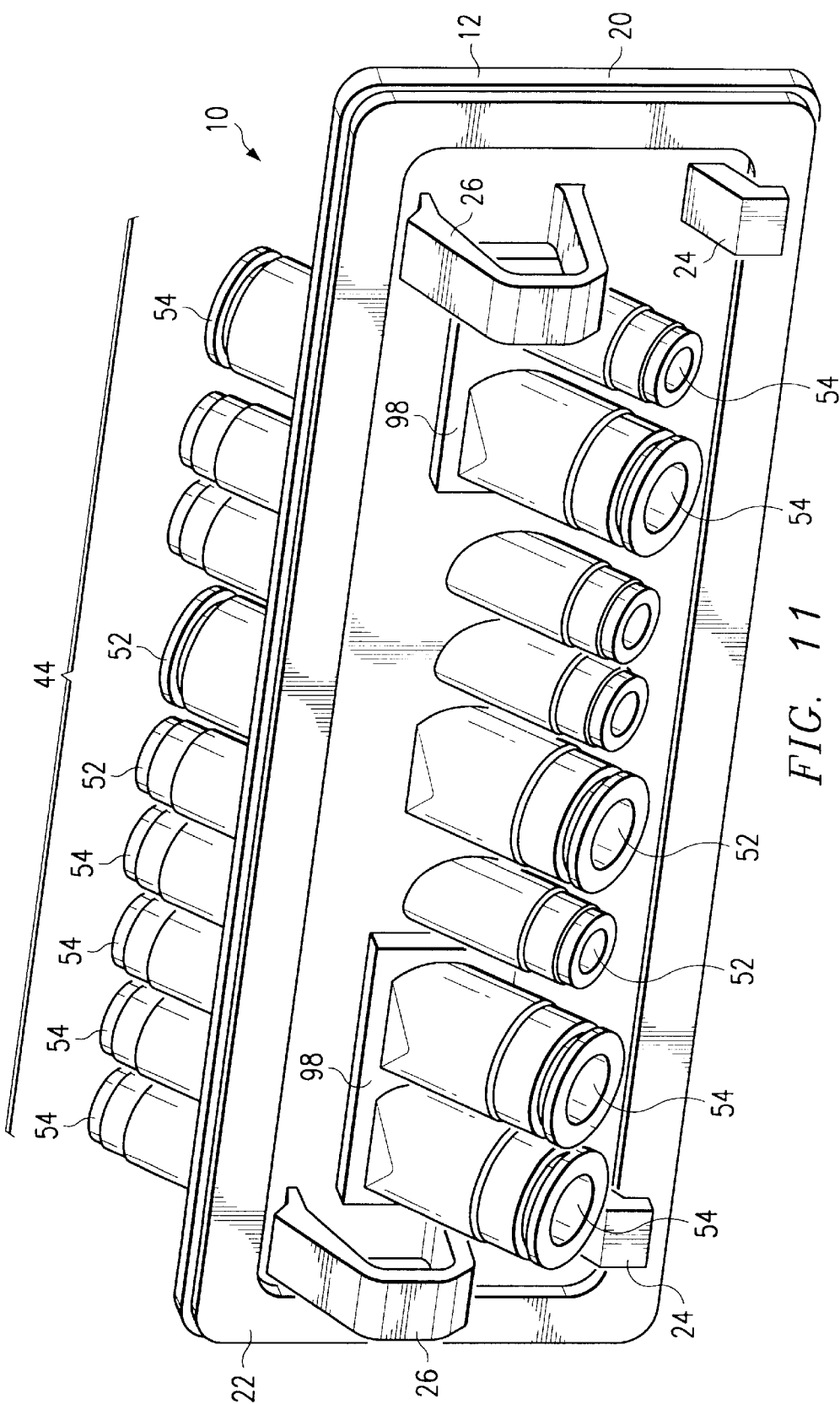
FIG. 11 is a perspective view of an air management apparatus having multiple pass-through air passages and multiple manifold air passages arranged in a line according to the present invention.

In addition, although the preferred embodiment illustrates a set of air passages arranged in a particular array, the scope of this invention should not be limited to a particular arrangement of air passages. For instance, it is possible to arrange the air passages in a single line as shown in FIG. 11. In this manner, air management apparatus 10 can be formed in a shape that best suits the needs of the particular application, i.e., air management apparatus 10 can be modified to fit in unusual spaces.

The air management system can be made of any suitable material or combination of materials. The preferred embodiment is constructed of plastic, but it can be made of metal or combination of metal and plastic.

Having thus described in detail a preferred selection of embodiments of the present invention, it is to be appreciated and will be apparent to those skilled in the art that many physical changes could be made in the apparatus without altering the inventive concepts and principles embodied therein.

I claim:

1. An air management apparatus comprising:
   a base plate having a first side and a second side;
   a pass-through air passage formed in said base plate, a first portion of said pass-through air passage extending from said first side of said base plate and a second portion of said pass-through air passage extending from said second side of said base plate; and
   a manifold air passage formed in said base plate, a first portion of said manifold air passage extending from said first side of said base plate and a second portion of said manifold air passage extending from said second side of said base plate, wherein said first and second portions of said pass-through air passage and said first and second portions of said manifold air passage are each oriented to form an acute angle relative to a plane defined by said base plate.

2. An air management apparatus in accordance with claim 1, wherein said base plate comprises a substantially flat base element having a pair of retaining clips for attaching said base plate to a wall.

3. An air management apparatus in accordance with claim 2, wherein each of said pair of retaining clips has a first end fixed to said base element and a second end movable relative to said base element, and said second end can be moved between a released position and an attached position.

4. An air management apparatus in accordance with claim 1, wherein said pass-through air passage and said manifold air passage each has an inlet port and an outlet port, each of said ports having an air hose connector attached thereto.

5. An air management apparatus in accordance with claim 1, wherein said pass-through air passage and said manifold air passage each has indicia for specifying a corresponding hose to be attached to said pass-through air passage and said manifold air passage.

6. An air management apparatus in accordance with claim 1, wherein said acute angle is approximately 30 to 60 degrees.

7. An air management apparatus in accordance with claim 1, further comprising a gasket along a perimeter of said base plate.

8. An air management apparatus in accordance with claim 1, further comprising an exhaust air passage formed in said base plate.

9. An air management apparatus for transporting air between a first side of a wall and a second side of a wall, said air management apparatus comprising:

a base plate having a first side and a second side;

a plurality of pass-through air passages formed in said base plate, a first portion of each of said plurality of pass-through air passages extending from said first side of said base plate and having one inlet port therein and a second portion of each of said plurality of pass-through air passages extending from said second side of said base plate and having one outlet port therein; and a plurality of manifold air passages formed in said base plate, a first portion of each of said plurality of manifold air passages extending from said first side of said base plate and having one inlet port therein and a second portion of each of said plurality of manifold air passages extending from said second side and having at least two outlet ports therein, wherein said first and second portions of said pass-through air passage and said first and second portions of said manifold air passage are each oriented to form an acute angle relative to a plane defined by said base plate, and air can be received into said inlet port of any one of said plurality of pass-through air passages and said plurality of manifold air passages, and can be expelled out of at least one corresponding outlet port of any of said plurality of pass-through air passages and said plurality of manifold air passages.

10. An air management apparatus in accordance with claim 9, further comprising two or more retaining clips mounted on said base plate for attaching said base plate to a wall.

11. An air management apparatus in accordance with claim 10, further comprising a pair of feet on said base plate for aligning and seating said base plate on said wall.

12. An air management apparatus in accordance with claim 11, wherein said retaining clips have a first end fixed to said base plate and a second end movable relative to said base plate, and said second end can be moved between a released position and an attached position.

13. An air management apparatus in accordance with claim 10, further comprising air hose connectors attached to said inlet ports and said outlet ports.

14. An air management apparatus in accordance with claim 10, wherein each of said plurality of pass-through air passages and each of said plurality of manifold air passages has an indicia for specifying hoses to be attached to a corresponding one of said plurality of pass-through air passages and said plurality of manifold air passages.

15. An air management apparatus in accordance with claim 10, wherein said acute angle is from 30 to 60 degrees.

16. An air management apparatus in accordance with claim 10, further comprising a gasket secured along a perimeter of said base plate.

17. An air management apparatus in accordance with claim 10, further comprising one or more exhaust air passages formed in said base plate, each having an inlet port and an exhaust port.

18. An air management apparatus for transporting air through a wall located between a truck cab interior and a truck engine compartment, said air management apparatus comprising:

a base plate having a pair of feet for aligning and seating said base plate on said wall and a pair of retaining clips for removably attaching said base plate to said wall, each of said retaining clips having a first end fixed to said base plate and a second end movable relative to said base plate, said second end being movable between a released position and an attached position;

a first plurality of pass-through air passages formed in said base plate, each of said first plurality of pass-through air passages having one inlet port and one outlet port;

a second plurality of pass-through air passages formed in said base plate, each of said second plurality of pass-through air passages having one inlet port and one outlet port;

a first plurality of manifold air passages formed in said base plate, each of said first plurality of manifold air passages having one inlet port and at least two outlet ports;

a second plurality of manifold air passages formed in said base plate, each of said second plurality of manifold air passages having one inlet port and at least two outlet ports;

one or more exhaust air passages formed in said base plate, each of said plurality of exhaust air passages having one inlet port and one exhaust port;

an air hose connector attached to each inlet port and each outlet port;

wherein each of said first plurality of pass-through air passages has a diameter larger than a diameter of each of said second plurality of pass-through air passages, and each of said first plurality of manifold air passages has a diameter larger than a diameter of each of said second plurality of manifold air passages.

19. An air management apparatus in accordance with claim 18, further comprising an indicia for specifying a corresponding air hose to be attached to each of said air hose connectors.

20. An air management apparatus in accordance with claim 18, wherein each of said first plurality of pass-through air passages, said second plurality of pass-through air passages, said first plurality of manifold air passages, said second plurality of manifold air passages, and said one or more exhaust air passages has a longitudinal axis, each of said longitudinal axes is oriented in a substantially uniform direction, and said uniform direction of said longitudinal axes forms an acute angle relative to a plane defined by said base plate.

21. An air management apparatus in accordance with claim 20, wherein said acute angle is from 30 to 60 degrees.

22. A method of controlling air transfer through a wall, said method comprising the steps of:

providing a base plate having a pass-through air passage and a manifold air passage wherein a first portion of said pass-through air passage and a first portion of said manifold air passage extend from a first side of said base plate and form an acute angle relative to a plane defined by said base plate, and a second portion of said pass-through air passage and a second portion of said manifold air passage extend from a second side of said base plate and form an acute angle relative to said plane defined by said base plate;

attaching said base plate having said pass-through air passage and said manifold air passage formed therein to said wall;

transporting air through said pass-through air passage formed in said base plate; and transporting air through said manifold air passage formed in said base plate.

23. A method of controlling air transfer through a wall in accordance with claim 22, further comprising the step of selectively transporting air through an exhaust air passage formed in said base plate.

24. A method of controlling air transfer through a wall in accordance with claim 22, wherein said step of transporting air through said pass-through air passage comprises receiving said air into a single inlet port of said pass-through air passage and expelling said air out of a single outlet port of said pass-through air passage, and wherein said step of transporting air through a manifold air passage comprises receiving said air into a single inlet port of said manifold air passage and expelling said air out of at least two outlet ports of said manifold air passage.

25. A method of controlling air transfer through a wall in accordance with claim 24, further comprising providing indicia to identify which outlet ports are connected with which inlet ports.

26. An air management apparatus for transporting air through a wall located between a truck cab interior and a truck engine compartment, said air management apparatus comprising:

a base plate having a pair of feet for aligning and seating said base plate on said wall and a pair of retaining clips for removably attaching said base plate to said wall;

a first pass-through air passage formed in said base plate, said first pass-through air passage having one inlet port and one outlet port;

a second pass-through air passage formed in said base plate, each of said second pass-through air passage having one inlet port and one outlet port; and an air hose connector attached to each inlet port and each outlet port, wherein said first pass-through air passage has a diameter larger than a diameter of said second pass-through air passage.

27. An air management apparatus in accordance with claim 26, further comprising a manifold air passage formed in said base plate.

28. An air management apparatus for transporting air through a wall located between a truck cab interior and a truck engine compartment, said air management apparatus comprising:

a base plate having a pair of feet for aligning and seating said base plate on said wall and a pair of retaining clips for removably attaching said base plate to said wall, each of said retaining clips having a first end fixed to said base plate and a second end movable relative to said base plate, said second end being movable between a released position and an attached position;

a first plurality of pass-through air passages formed in said base plate, each of said first plurality of pass-through air passages having one inlet port and one outlet port;

a second plurality of pass-through air passages formed in said base plate, each of said second plurality of pass-through air passages having one inlet port and one outlet port;

a first plurality of manifold air passages formed in said base plate, each of said first plurality of manifold air passages having one inlet port and at least two outlet ports;

a second plurality of manifold lair passages formed in said base plate, each of said second plurality of manifold air passages having one inlet port and at least two outlet ports;

one or more exhaust air passages formed in said base plate, each of said plurality of exhaust air passages having one inlet port and one exhaust port; and an air hose connector attached to each inlet port and each outlet port.

\* \* \* \* \*

UNITED STATES PATENT AND TRADEMARK OFFICE
CERTIFICATE OF CORRECTION

PATENT NO.     : 6,447,023 B1
DATED          : September 10, 2002
INVENTOR(S)    : Mark T. Grimm It is certified that error appears in the above-identified patent and that said Letters Patent is hereby corrected as shown below:

Column 10,
Line 5, delete "claim 11" and insert -- claim 10 --.
Lines 10, 13, 18, 20 and 23, delete "claim 10" and insert -- claim 9 --.

Signed and Sealed this

First Day of July, 2003

JAMES E. ROGAN
*Director of the United States Patent and Trademark Office*